(12) United States Patent
Zhou et al.

(10) Patent No.: US 11,963,542 B2
(45) Date of Patent: Apr. 23, 2024

(54) CASEIN MICELLE WITH COMPOSITION AND STRUCTURAL FEATURES SIMULATING HUMAN MILK AND PREPARATION METHOD THEREOF

(71) Applicant: Jiangnan University, Wuxi (CN)

(72) Inventors: Peng Zhou, Wuxi (CN); Dasong Liu, Wuxi (CN); Tingting Yang, Wuxi (CN); Lina Zhang, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 18/120,628

(22) Filed: Mar. 13, 2023

(65) Prior Publication Data
US 2023/0210156 A1    Jul. 6, 2023

Related U.S. Application Data

(63) Continuation of application No. PCT/CN2022/093268, filed on May 17, 2022.

(30) Foreign Application Priority Data

Feb. 10, 2022 (CN) .......................... 202210149999.0

(51) Int. Cl.
*A23L 33/19* (2016.01)
*A23J 1/20* (2006.01)
(Continued)

(52) U.S. Cl.
CPC .............. *A23L 33/19* (2016.08); *A23J 1/202* (2013.01); *A23J 3/10* (2013.01); *A23L 33/40* (2016.08)

(58) Field of Classification Search
CPC . A23L 33/19; A23L 33/40; A23J 1/202; A23J 3/10
(Continued)

(56) References Cited

U.S. PATENT DOCUMENTS

2019/0030048 A1*  1/2019  Livney ................ A61K 9/1075

FOREIGN PATENT DOCUMENTS

| CN | 1073075 A | 6/1993 |
| CN | 105695542 A | 6/2016 |

(Continued)

*Primary Examiner* — Brent T O'Hern
(74) *Attorney, Agent, or Firm* — IPRO, PLLC (57) ABSTRACT

The present disclosure discloses a casein micelle with composition and structural features simulating human milk and a preparation method thereof. The method includes the following steps: adding a citrate ion, a calcium ion, and a phosphate ion to a solution of compound casein to obtain a mixed solution; and then adjusting the pH of the mixed solution to 6.7-7.4, and achieving a constant volume with water to obtain a solution of the casein micelle simulating human milk. Wherein β-casein, κ-casein, and $\alpha_{s1}$-casein have a mass proportion of 65-71%, 17-23%, and 9-15% in the compound casein respectively. In the solution of the casein micelle simulating human milk, the concentrations of compound casein, citrate ion, calcium ion and phosphate ion were 0.3-0.6%, 1.5-4.2 mM, 4.5-10.8 mM, and 1.1-4.5 mM, respectively. The casein micelle simulating human milk of the present disclosure is similar to human milk casein micelle, and has low allergenicity.

12 Claims, 6 Drawing Sheets

(51) Int. Cl.
*A23J 3/10* (2006.01)
*A23L 33/00* (2016.01)

(58) Field of Classification Search
USPC .......................................................... 426/588
See application file for complete search history.

(56) References Cited

FOREIGN PATENT DOCUMENTS

| | | |
|---|---|---|
| CN | 106417888 A | 2/2017 |
| CN | 113080468 A | 7/2021 |
| CN | 113461795 A | 10/2021 |

\* cited by examiner

CASEIN MICELLE WITH COMPOSITION AND STRUCTURAL FEATURES SIMULATING HUMAN MILK AND PREPARATION METHOD THEREOF

TECHNICAL FIELD

The present disclosure relates to a casein micelle with composition and structural features simulating human milk and a preparation method thereof, and belongs to the technical field of processing of dairy products.

BACKGROUND

Under the condition that breast feeding cannot be achieved, infant formula powders are still used as preferred substitutes for human milk, and have a research and development goal of achieving the same feeding effect as the human milk to a maximum degree. The human milk is used as a golden standard for the research and development of the infant formula powders, and the research and development process of the infant formula powders is to promote a process of simulating the human milk. The milk mainly includes two proteins: casein and a whey protein. As for the protein part, a strategy for the research and development of the infant formula powders mainly includes simulating the human milk according to a ratio of the casein to the whey protein. Commercially available infant formula powders still have a big gap with the human milk in subdivided components of the protein, and especially have a big difference with human milk casein in casein composition, mineralization degree, and physical structure.

A ratio of the casein to the whey protein in cow milk is 8:2, and a ratio of the casein to the whey protein in the human milk is 4:6. The casein and the whey protein in the infant formula powders are mainly derived from the cow milk, and a ratio of the two substances is usually adjusted to 4:6 to simulate the protein composition of the human milk. The gastric emptying rate and digestibility of infant formula powders are usually lower than those of the human milk, which is related to the difference of the two substances in casein composition and ratio. The cow milk contains $\alpha_{s1}$-casein, $\alpha_{s2}$-casein, $\beta$-casein, and $\kappa$-casein at a ratio of about 4:1:3.5:1.5, and the $\alpha_{s1}$-casein and the $\alpha_{s2}$-casein have higher allergenicity. The human milk contains $\beta$-casein, $\alpha_{s1}$-casein, and $\kappa$-casein at a ratio of about 68:12:20, and the human milk does not contain $\alpha_{s2}$-casein.

The casein in the milk mainly exists in the form of a micelle structure. A cow milk casein micelle has an average particle size of about 150 nm, and a human milk casein micelle has an average particle size of about 70 nm. The cow milk casein micelle has a higher mineralization degree than the human milk casein micelle. In the cow milk casein micelle, a molar ratio of the casein to calcium is about 18-19, and in the human milk casein micelle, a molar ratio of the casein to calcium is only 7-9. Compared with the cow milk casein micelle, the human milk casein micelle also has a looser structure. The cow milk casein micelle has a hydration rate of about 2.3 g water/g dry micelle, and the human milk casein micelle has a hydration rate of as high as 3.4 g water/g dry micelle. At 25° C., free casein has a proportion of about 5% in the cow milk and a proportion of about 15% in the human milk. The cow milk casein micelle and the human milk casein micelle have a difference in composition and structure, resulting in a big difference in digestion, absorption, allergenicity, and physiological functions of the two substances, and thus the growth and development of infants are affected.

In the patents CN1073075A and U.S. Pat. No. 5,173,322, a recombinant casein micelle was prepared by sequentially adding a soluble calcium salt and a phosphate salt to a sodium caseinate solution, conducting concentration by ultrafiltration, and removing an excess salt. The recombinant casein micelle can be used as a substitute for fat in a coffee whitening agent. In the U.S. Pat. No. 3,995,070, a recombinant casein micelle was prepared by sequentially adding an organic acid salt and a calcium salt to a redissolved casein solution after acid precipitation, and then conducting evaporation concentration and spray-drying. The recombinant casein micelle has good solubility and thermal stability. The above recombinant casein micelles are identical with the cow milk casein micelle in casein composition. In addition, an in vivo environment for the formation of a natural casein micelle is complex, in which a variety of ions and interactions thereof with the casein are involved. A micelle similar to a natural cow milk casein micelle in mineralization degree and structure is difficult to obtain by a simple recombination process.

In the patent CN106259953A, the content of $\beta$-casein in a prepared infant formula powder was increased by adding $\beta$-casein to skimmed milk. According to the technology, the infant formula powder is similar to the human milk only in the relative content of the $\beta$-casein, and cannot be similar to the human milk in the relative contents of $\alpha_{s1}$-casein and $\kappa$-casein at the same time. Moreover, due to $\alpha_{s2}$-casein brought by the skimmed milk, the infant formula powder has high allergenicity. In addition, a casein micelle formed in the infant formula powder also cannot be similar to a natural human milk casein micelle in mineralization degree and structure by enhancement of a single $\beta$-casein component.

At present, no research has been conducted on recombination of a casein micelle simulating the human milk based on the composition and structure of the human milk casein micelle with the cow milk, goat milk, and other kinds of animal milk casein as a raw material.

SUMMARY

In the present disclosure, animal milk such as cow milk or goat milk is used as a raw material, and casein components are separated and purified by alkaline depolymerization, calcium ion precipitation, acid precipitation, low-temperature dissociation, and other selective separation technologies. First, with the casein composition of human milk as a standard, the casein components are mixed to achieve compounding of the casein composition simulating human milk. Then, with the ion composition of the human milk as a standard, a casein micelle simulating human milk is prepared by ion adjustment technologies including key ion type, ion addition sequence, ion addition method and batch, and ion concentration. The casein micelle is similar to a human milk casein micelle in casein composition, mineralization degree, micelle structure, and digestibility, and has low allergenicity.

The present disclosure provides a method for preparing a casein micelle simulating human milk. The method includes the following steps:
adding a citrate ion, a calcium ion, and a phosphate ion to a solution of compound casein to obtain a mixed solution; and then adjusting the pH of the mixed solution to 6.7-7.4, and achieving a constant volume to obtain a solution of the casein micelle simulating human milk;

where β-casein, κ-casein, and $\alpha_{s1}$-casein have a mass proportion of 65-71%, 17-23%, and 9-15% in the compound casein respectively; and in the solution of the casein micelle simulating human milk, the compound casein has a mass concentration of 0.3-0.6%, the citrate ion has a concentration of 1.5-4.2 mM, the calcium ion has a concentration of 4.5-10.8 mM, and the phosphate ion has a concentration of 1.1-4.5 mM.

In an embodiment of the present disclosure, a method for preparing the compound casein includes the following steps:

(1) subjecting animal milk to centrifugation at 20-30° C. and 2,000-4,000 g for 20-40 minutes to obtain skimmed milk; adding a hydrochloric acid solution (4-8 M) until the pH is 4.3-4.9, and conducting centrifugation at 5,000-15,000 g for 10-20 minutes; and redissolving a casein precipitate in water, and adding a NaOH solution (1-3 M) until the pH is 10-12 to obtain a casein redissolved solution, where casein has a mass concentration of 2-3%;

(2) adding calcium chloride to the casein redissolved solution to reach a concentration of 50-70 mM, and conducting centrifugation at 5,000-15,000 g for 10-20 minutes to obtain a precipitate rich in $\alpha_s$-casein and β-casein and a supernatant rich in κ-casein; adding a hydrochloric acid solution to the supernatant rich in κ-casein until the pH is 3-4, and conducting centrifugation to obtain a precipitate rich in κ-casein; redissolving the precipitate rich in $\alpha_s$-casein and β-casein in water, and adding a NaOH solution until the pH is 6.5-7.5 to make the casein have a mass concentration of 2-3%; and lowering the temperature to 0-8° C., adding a hydrochloric acid solution until the pH is 4.3-4.9, maintaining the solution at 0-8° C. for 4-8 hours, taking a supernatant after centrifugation, heating the supernatant to 30-40° C., and then conducting centrifugation to obtain a precipitate rich in β-casein; and (3) mixing the precipitate rich in κ-casein with the precipitate rich in β-casein according to a casein mass ratio of 6:4 to 8:2, conducting dialysis at 0-8° C. for 48-96 hours by using a dialysis membrane with a molecular weight cut-off of 5,000-10,000 Da, adding an ion exchange resin, namely Amberlite SR1L Na (0.4-0.6 g resin/g casein), to a dialysate, and after the dialysis is completed, conducting freeze-drying to obtain the compound casein.

In an embodiment of the present disclosure, the animal milk includes cow milk, goat milk, sheep milk, buffalo milk, yak milk, dromedary camel milk, bactrian camel milk, horse milk, donkey milk and the like.

In an embodiment of the present disclosure, the solution of compound casein is obtained by dissolving the compound casein in water, and the casein has a mass concentration of 0.6-1.2%.

In an embodiment of the present disclosure, the citrate ion is brought by a stock solution of one or two of potassium citrate and sodium citrate, and the citrate ion has a concentration of 150-420 mM in the stock solution.

In an embodiment of the present disclosure, the calcium ion is brought by a stock solution of one or two of calcium chloride and calcium nitrate, and the calcium ion has a concentration of 30-72 mM in the stock solution.

In an embodiment of the present disclosure, the phosphate ion is brought by a stock solution of one or two of dipotassium hydrogen phosphate and disodium hydrogen phosphate, and the phosphate ion has a concentration of 7.3-30 mM in the stock solution.

In an embodiment of the present disclosure, the three ions involving the citrate ion, the calcium ion, and the phosphate ion are added in 2 addition sequences, including sequentially adding the citrate ion, the calcium ion, and the phosphate ion, or sequentially adding the phosphate ion, the calcium ion, and the citrate ion.

In an embodiment of the present disclosure, the three ions involving the citrate ion, the calcium ion, and the phosphate ion are added in 2 addition methods and 3-5 addition batches, including:

(1) dividing stock solutions of the calcium ion and the phosphate ion into 3-5 equal parts (by volume or mass); completely adding the citrate ion; sequentially adding 1 part of the calcium ion and 1 part of the phosphate ion; and repeating the step of adding the calcium ion and the phosphate ion for 2-4 times until the two ions are completely added; and (2) dividing stock solutions of the citrate ion, the calcium ion, and the phosphate ion into 3-5 equal parts; sequentially adding 1 part of the citrate ion, 1 part of the calcium ion and 1 part of the phosphate ion; and repeating the above three steps for 2-4 times until the three ions are completely added.

In an embodiment of the present disclosure, the temperature control, stirring rotation speed, and balance time after the three ions involving the citrate ion, the calcium ion, and the phosphate ion are added are 35-39° C., 500-1,000 rpm, and 10-30 minutes respectively.

In an embodiment of the present disclosure, the pH of the mixed solution is adjusted by adding a 0.01-0.05 M NaOH solution or a KOH solution.

In an embodiment of the present disclosure, the achieving a constant volume is conducted with water, and indicates that after achieving a constant volume, the volume of the solution of the casein micelle simulating human milk is 2-4 times that of the solution of the compound casein.

The present disclosure provides a casein micelle simulating human milk prepared by the method of the present disclosure.

The present disclosure provides application of the casein micelle simulating human milk of the present disclosure in processing of a dairy product.

In an embodiment of the present disclosure, the application includes providing a casein ingredient for research, development, and production of an infant formula powder.

In an embodiment of the present disclosure, the application includes subjecting an obtained solution of a casein micelle simulating human milk to ultrafiltration with a 5-20 kDa organic membrane, conducting concentration for 20-50 times to obtain a concentrate, and then conducting spray-drying or freeze-drying to obtain a casein ingredient for research, development, and production of an infant formula powder.

In the present disclosure, a casein micelle simulating human milk is obtained by recombination in casein composition, micelle mineralization degree, micelle structure, and other aspects. The casein micelle is more conducive to digestion, absorption, growth, and development of infants, and has low allergenicity.

(1) The casein micelle simulating human milk of the present disclosure is consistent with the human milk casein micelle in casein composition, is free of $\alpha_{s2}$-casein, and has low allergenicity.

(2) The casein micelle simulating human milk of the present disclosure is similar to the human milk casein micelle in mineralization degree.

(3) The casein micelle simulating human milk of the present disclosure is similar to the human milk casein micelle in average particle size, proportion of free casein, hydration rate, and other micelle structures.

(4) The casein micelle simulating human milk of the present disclosure is similar to the human milk casein micelle in digestibility. Fine flocculent particles are formed in a gastric juice, and the hydrolysis of casein in a digestion process is facilitated.

DETAILED DESCRIPTION

Preferred examples of the present disclosure are described below. It should be understood that the examples are intended to better explain the present disclosure, rather than to limit the present disclosure.

Unless otherwise specified, "%" in the embodiments refers to mass percentage. Unless otherwise specified, during equal division, a salt solution is equally divided by volume.

Test Methods:

1. Separation of Casein

A hydrochloric acid solution (2 M) was added to a casein micelle solution until the pH was 4.3 (human milk source) or the pH was 4.6 (cow milk source), and centrifugation was conducted at 10,000 g for 15 minutes to obtain a precipitate, namely casein.

2. Separation of a Micelle Phase and a Whey Phase

A casein micelle solution was subjected to centrifugation at 25° C. and 150,000 g for 1 hour to obtain a precipitate and a supernatant, namely a micelle phase and a whey phase respectively.

3. Determination of the Content of Casein

The content of casein was determined by a Kjeldahl method with a conversion coefficient of 6.38.

4. Determination of the Composition of Casein

The composition of casein was determined by an e2695 high performance liquid chromatograph (Waters Corp., Milford, MA, USA) with XBridge BEH C18 (250 mm*4.6 mm) as a chromatographic column, and detection was conducted at a wavelength of 220 nm.

5. Determination of the Contents of a Calcium Ion, a Potassium Ion, a Sodium Ion, and a Phosphate Ion With reference to the national standard GB5009.268-2016 "National Food Safety Standard-Determination of Multi-elements in Foods", the contents of a calcium ion, a potassium ion, and a sodium ion were determined by inductively coupled plasma-mass spectrometry (ICP-MS). A protein was precipitated by trichloroacetic acid, a supernatant was taken, and the content of a phosphate ion was determined by ICP-MS.

6. Determination of the Content of a Citrate Ion

A protein was precipitated by trichloroacetic acid, a supernatant was taken, and the content of a citrate ion was determined by an e2695 high performance liquid chromatograph under the following chromatographic conditions: a mobile phase including 98% of 0.1 M $KH_2PO_4$ (pH 3.0) and 2% of acetonitrile (%: volume percentage), a flow rate of 1.0 mL/min, a chromatographic column of Symmetry C18 (250 mm*4.6 mm), and a detection wavelength of 214 nm.

7. Determination of the Absorbance

The absorbance of a recombinant casein micelle and a human milk casein micelle solution was determined by a spectrophotometer. Detection was conducted at a wavelength of 400 nm, and a sample pool had a thickness of 10 mm.

8. Determination of the Particle Size of a Micelle

The particle size distribution of a casein micelle was determined by a Malvern nanometer particle size potentiometer (Malvern Instruments Ltd., Malvern, Worcestershire, UK) with a protein particle refractive index of 1.57.

9. Determination of the Hydration Rate of a Micelle

A micelle phase was subjected to centrifugation at high speed to obtain a precipitate, the precipitate was dried at 103° C. for 7 hours, and then the dry base moisture content of the precipitate was determined to obtain the hydration rate of a micelle.

10. In Vitro Gastric Digestion of an Infant

A casein micelle solution was mixed with a simulated gastric digestive fluid (94 mM sodium chloride and 13 mM potassium chloride, with a pH of 5.3) at a volume ratio of 63:37, a hydrochloric acid solution (1 M) was slowly added to adjust the pH to 5.3, and pepsin was added under stirring to reach a concentration of 268 U/mL. A digestion reaction was carried out at a temperature of 37° C. for 0-60 minutes, and a pepsin inhibitor was used to stop the digestion reaction.

11. Analysis of the Hydrolysis Efficiency of a Protein

The hydrolysis efficiency of a protein is analyzed by SDS-PAGE. A stomach digesta was mixed with a sample buffer containing 5% (volume percentage) of β-mercaptoethanol at a volume ratio of 1:1 in a boiling water bath for 3 minutes at a loading quantity of 10 μL. A spacer gel and a separation gel had a mass concentration of 4% and 13% respectively.

12. Determination of the Hydrolysis Degree of a Protein 3.810 g of sodium tetraborate, 0.088 g of dithiothreitol, 0.100 g SDS, and 0.080 g of OPA were weighed and brought to a constant volume of 100 mL so as to obtain an OPA reagent. A 0-10 mM L-leucine solution was used as a standard product. 100 μL of the standard product or a gastric digesta (60 minutes) was mixed with 2 mL of the OPA reagent for a reaction in a dark place for 2 minutes, and the absorbance was determined at 340 nm. The content of free amino in the gastric digesta was calculated based on a standard curve.

A calculation formula of the hydrolysis degree was as shown in the following Formula (1):

$$\text{Hydrolysis degree} = \frac{\text{Number of hydrolyzed peptide bonds}}{\text{Total number of peptide bonds}} \times 100\% = \frac{h}{h_{hot}} \times 100\%, \quad (1)$$

and a calculation formula of h was as shown in Formula (2):

$$h = (\text{Serine-NH}_2 - \beta)/\alpha$$

where $h_{tot} = 8.2$, $\alpha = 1.039$, and $\beta = 0.383$.

Example 1 Preparation of a Compound Casein Solution

A method for preparing a compound casein solution includes the following steps.

Fresh cow milk was subjected to centrifugation at 25° C. and 3,000 g for 30 minutes to obtain skimmed cow milk.

A hydrochloric acid solution (6 M) was added to the skimmed cow milk until the pH was 4.6, and centrifugation was conducted at 10,000 g for 15 minutes. A cow milk casein precipitate was redissolved in water, and a NaOH solution (2 M) was added until the pH was 11 to obtain a casein redissolved solution, where casein had a mass concentration of 2.5%.

Calcium chloride was added to the casein redissolved solution to reach a concentration of 65 mM, and centrifugation was conducted at 10,000 g for 15 minutes to obtain a precipitate rich in $\alpha_s$-casein and β-casein and a supernatant rich in κ-casein.

A hydrochloric acid solution (6 M) was added to the supernatant rich in κ-casein until the pH was 3.8, and centrifugation was conducted at 10,000 g for 15 minutes to obtain a precipitate rich in κ-casein.

The precipitate rich in $\alpha_s$-casein and β-casein was redissolved in water, and a NaOH solution (2 M) was added until the pH was 7.0 to make the casein have a mass concentration of 2.5%. The temperature was lowered to 4° C., a hydrochloric acid solution (6 M) was added until the pH was 4.6, and the solution was maintained at 4° C. for 6 hours. A supernatant was taken after centrifugation at 10,000 g for 15 minutes, heated to 35° C., and subjected to centrifugation at 10,000 g for 15 minutes to obtain a precipitate rich in β-casein.

The precipitate rich in κ-casein was mixed with the precipitate rich in β-casein according to a casein mass ratio of 7:3. Dialysis was conducted at 4° C. for 72 hours by using a dialysis membrane with a molecular weight cut-off of 7,000 Da to remove a salt. An ion exchange resin, namely Amberlite SR1L Na (0.5 g resin/g casein), was added to a dialysate. After the dialysis was completed, freeze-drying was conducted to achieve compounding of the casein composition simulating human milk, and that is, compound casein was obtained.

The protein composition of the cow milk casein precipitate, the precipitate rich in κ-casein, the precipitate rich in β-casein, and the compound casein is as shown in Table 1.

TABLE 1

Casein composition of various samples

| Sample | κ-casein | $\alpha_{s1}$-casein | $\alpha_{s2}$-casein | β-casein |
|---|---|---|---|---|
| Cow milk casein precipitate (%) | 14.1 ± 0.4 | 40.2 ± 0.2 | 10.1 ± 0.1 | 35.6 ± 0.5 |
| Precipitate rich in κ-casein (%) | 27.4 ± 0.5 | 16.1 ± 0.7 | 0 | 56.5 ± 0.6 |
| Precipitate rich in β-casein (%) | 0 | 0 | 0 | 100 |
| Compound casein (%) | 20.3 ± 0.8 | 11.9 ± 0.4 | 0 | 67.8 ± 1.4 |

Example 2 Preparation of a Casein Micelle Simulating Human Milk

A method for preparing a casein micelle simulating human milk includes the following steps.

The compound casein in Example 1 was redissolved in deionized water to obtain a compound casein redissolved solution, where casein had a mass concentration of 0.8%, and the redissolved solution had a volume of 10 mL.

200 μL of a 230 mM potassium citrate solution, 3 mL of a 47.3 mM calcium chloride solution, and 3 mL of a 18.6 mM dipotassium hydrogen phosphate solution were prepared, and then the three salt solutions were divided into 3 equal parts.

1 part of the potassium citrate solution was added to the compound casein redissolved solution, and stirred at 37° C. and a stirring rotation speed of 800 rpm for 30 minutes. 1 part of the calcium chloride solution was added, and stirred for 30 minutes. 1 part of the dipotassium hydrogen phosphate solution was added, and stirred for 30 minutes. The above three steps were repeated for two times until the three salt solutions were completely added to obtain a mixed solution.

A 0.01 M sodium hydroxide solution was added to the mixed solution until the pH was 7.2, and deionized water was added to the mixed solution to achieve a constant volume of 20 mL so as to obtain a solution of the casein micelle simulating human milk, where in the solution of the casein micelle simulating human milk, the compound casein had a mass concentration of 0.4%, a citrate ion (Cit) had a concentration of 2.3 mM, a calcium ion (Ca) had a concentration of 7.1 mM, and a phosphate ion (P) had a concentration of 2.8 mM.

Comparative Example 1 Human Milk Casein Micelle

Fresh human milk (mature milk obtained after delivery for 3-8 months) was subjected to centrifugation at 25° C. and 3,000 g for 30 minutes to obtain skimmed human milk, namely, a natural human milk casein micelle solution.

Comparative Example 2 Cow Milk Casein Micelle

Fresh cow milk was subjected to centrifugation at 25° C. and 3,000 g for 30 minutes to obtain skimmed cow milk, namely, a natural cow milk casein micelle solution.

Physicochemical properties of the casein micelle solutions prepared in Example 2 and Comparative Examples 1 and 2 were tested. Results are as follows.

TABLE 2

Physicochemical properties of the casein micelle solutions in Example 2 and Comparative Examples 1 and 2

| Index | Casein micelle simulating human milk (Example 2) | Human milk casein micelle (Comparative Example 1) | Cow milk casein micelle (Comparative Example 2) |
|---|---|---|---|
| Casein (mM) | 0.17 ± 0.01 | 0.17 ± 0.02 | 1.11 ± 0.05 |
| β-casein (%) | 67.8 ± 1.4 | 68.2 ± 0.2 | 36.5 ± 0.5 |
| $\alpha_{s1}$-casein (%) | 11.9 ± 0.4 | 12.0 ± 0.4 | 40.2 ± 1.5 |
| $\alpha_{s2}$-casein (%) | 0 | 0 | 10.1 ± 0.4 |
| κ-casein (%) | 20.3 ± 0.8 | 19.8 ± 0.6 | 13.2 ± 0.8 |
| Calcium ion (mM) | 7.1 ± 0.1 | 7.1 ± 0.2 | 30.1 ± 0.2 |
| Phosphate ion (mM) | 2.8 ± 0.1 | 2.8 ± 0.3 | 20.9 ± 0.5 |
| Citrate ion (mM) | 2.3 ± 0.1 | 2.3 ± 0.3 | 9.2 ± 0.2 |
| Potassium ion and sodium ion (mM) | 13.1 ± 0.2 | 21.5 ± 0.5 | 58.7 ± 1.2 |
| pH | 7.2 ± 0.2 | 7.2 ± 0.2 | 6.7 ± 0.1 |
| Average particle size (nm) | 78 ± 2 | 65 ± 3 | 151 ± 3 |
| Proportion of free calcium (%) | 69.8 ± 0.5 | 81.9 ± 0.7 | 33.4 ± 0.3 |
| Proportion of free casein (%) | 7.3 ± 0.2 | 14.1 ± 0.5 | 3.2 ± 0.3 |
| Mineralization degree (Micellar calcium/micellar casein, mM/mM) | 13.6 ± 0.1 | 8.8 ± 0.1 | 18.7 ± 0.7 |
| Hydration rate (g water/g dry micelle) | 2.9 ± 0.2 | 3.4 ± 0.1 | 2.3 ± 0.2 |
| Hydrolysis degree (%) | 13.6 ± 0.4 | 15.9 ± 0.5 | 11.1 ± 0.4 |

From Table 2, it can be seen that the human milk casein micelle solution and the cow milk casein micelle solution have a big difference in the composition and content of casein and ions, resulting in a big difference in micelle structural properties. Compared with the cow milk casein micelle, the human milk casein micelle has a lower average particle size, a lower mineralization degree, a higher proportion of free casein, and a higher hydration rate, indicating that the human milk casein micelle has a looser micelle structure. According to the method for preparing a casein micelle simulating human milk in Example 2, the composition and content of casein are equal to those of the human milk casein micelle solution by compounding of the casein, the composition and content of ions are equal to those of the human milk casein micelle solution by adjusting the ions, and a casein micelle simulating human milk is obtained. The casein micelle simulating human milk is similar to the human milk casein micelle in average particle size, proportion of free casein, mineralization degree, hydration rate, and other structural properties.

Figure 1:
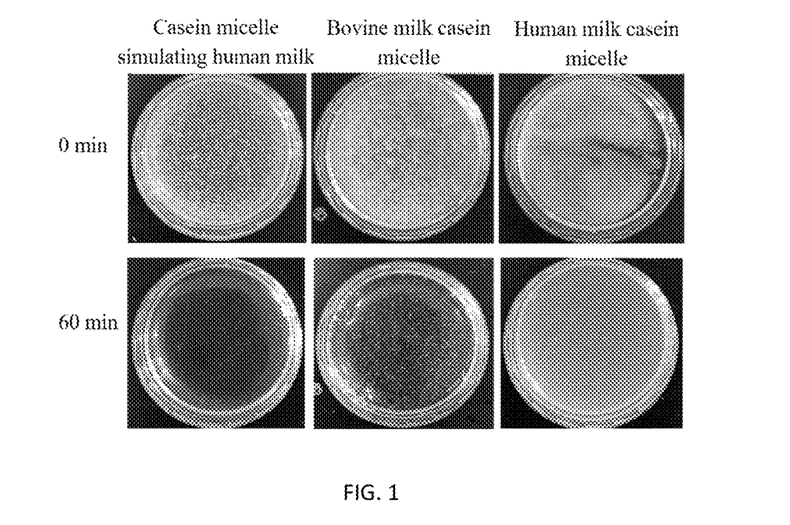
FIG. 1 shows structures of floccules formed after digestion of casein micelle solutions in Example 2 and Comparative Examples 1 and 2 in a simulated infant gastric juice for 0 minute and 60 minutes.
Figure 2:
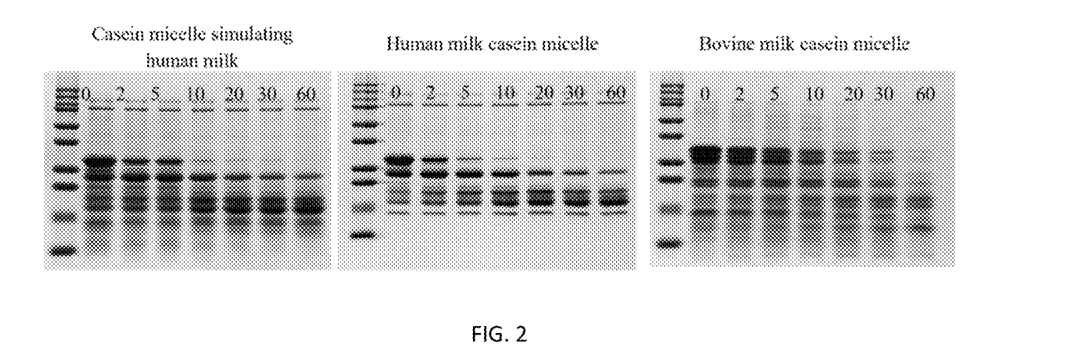
FIG. 2 shows SDS-PAGE diagrams of digesta formed after digestion of the casein micelle solutions in Example 2 and Comparative Examples 1 and 2 in a simulated infant gastric juice for 0-60 minutes.

The human milk casein micelle solution and the cow milk casein micelle solution were maintained at 50° C. for 30 minutes, and then subjected to centrifugation immediately at 150,000 g for 1 hour. A precipitate was redissolved in deionized water to obtain a redissolved solution of a human milk casein micelle and a cow milk casein micelle, where casein had a mass concentration of 0.4%. A comparative study was carried out on digestibility of the redissolved solution and the casein micelle solution simulating human milk. When the above solutions are mixed with a simulated infant gastric juice, flocculent particles formed by the cow milk casein micelle solution are larger, flocculent particles formed by the human milk casein micelle solution are smaller, and flocculent particles formed by the casein micelle solution simulating human milk are similar to that of the human milk casein micelle solution (as shown in FIG. 1). After digestion for 60 minutes, the cow milk casein micelle solution still has some flocculent particles in a digesta, while the human milk casein micelle solution and the casein micelle solution simulating human milk have no flocculent particles in digesta. According to SDS-PAGE diagrams of the digesta, it is shown that compared with the cow milk casein micelle solution, the human milk casein micelle solution has a higher hydrolysis rate of casein, and the casein micelle solution simulating human milk has a hydrolysis rate of casein similar to that of the human milk casein micelle solution (as shown in FIG. 2). After digestion for 60 minutes, compared with the cow milk casein micelle solution, the human milk casein micelle solution has a higher hydrolysis degree of casein, and the casein micelle solution simulating human milk has a hydrolysis degree of casein similar to that of the human milk casein micelle solution.

According to the above results, it is shown that the casein micelle solution simulating human milk is similar to the human milk casein micelle solution in casein composition, micelle mineralization degree, and micelle structural properties, so that the two solutions are also similar in digestibility and have better digestibility than the cow milk casein micelle solution.

Comparative Example 3 Recombinant Casein Micelles Formed by Compound Casein Induced by Low and High Concentrations of a Calcium Ion The concentration of the calcium chloride solution in Example 2 was adjusted to 34 mM and 67 mM to make the concentration of a calcium ion in recombinant casein micelle solutions reach 5.1 mM and 10.1 mM respectively, other steps were consistent with those in Example 2, and a low-calcium recombinant casein micelle solution and a high-calcium recombinant casein micelle solution were obtained.

Physicochemical properties of the casein micelle solutions prepared in Example 2 and Comparative Examples 1 and 3 were tested. Results are as follows.

TABLE 3

Physicochemical properties of the casein micelle solutions in Example 2 and Comparative Examples 1 and 3

| Index | Medium-calcium recombinant casein micelle (Example 2) | Human milk casein micelle (Comparative Example 1) | Low-calcium recombinant casein micelle (Comparative Example 3) | High-calcium recombinant casein micelle (Comparative Example 3) |
|---|---|---|---|---|
| Calcium ion (mM) | 7.1 ± 0.1 | 7.1 ± 0.2 | 5.1 ± 0.1 | 10.1 ± 0.1 |
| Average particle size (nm) | 78 ± 2 | 65 ± 3 | 55 ± 2 | 120 ± 3 |

TABLE 3-continued

Physicochemical properties of the casein micelle solutions in
Example 2 and Comparative Examples 1 and 3

| Index | Medium-calcium recombinant casein micelle (Example 2) | Human milk casein micelle (Comparative Example 1) | Low-calcium recombinant casein micelle (Comparative Example 3) | High-calcium recombinant casein micelle (Comparative Example 3) |
|---|---|---|---|---|
| Proportion of free calcium (%) | 69.8 ± 0.5 | 81.9 ± 0.7 | 66.2 ± 0.5 | 74.9 ± 0.3 |
| Proportion of free casein (%) | 7.3 ± 0.2 | 14.1 ± 0.5 | 22.9 ± 0.3 | 1.7 ± 0.3 |
| Mineralization degree | 13.6 ± 0.1 | 8.8 ± 0.1 | 13.1 ± 0.2 | 15.2 ± 0.2 |
| Hydration rate (g water/g dry micelle) | 2.9 ± 0.2 | 3.4 ± 0.1 | 3.2 ± 0.1 | 2.6 ± 0.2 |
| Hydrolysis degree (%) | 13.6 ± 0.4 | 15.9 ± 0.5 | 14.5 ± 0.3 | 12.9 ± 0.3 |

From Table 3, it can be seen that compared with the high-calcium recombinant casein micelle, the low-calcium recombinant casein micelle and the medium-calcium recombinant casein micelle are more similar to the human milk casein micelle in average particle size, proportion of free casein, mineralization degree, hydration rate, and other structural properties. However, in the low-calcium recombinant casein micelle solution, the free caseins took a too high proportion, and did not participate in the formation of a micelle structure. Through comprehensive comparison, it is shown that the medium-calcium recombinant casein micelle is the most similar to the human milk casein micelle in structural properties. Thus, the medium-calcium recombinant casein micelle is used as the casein micelle simulating human milk.

Figure 3:
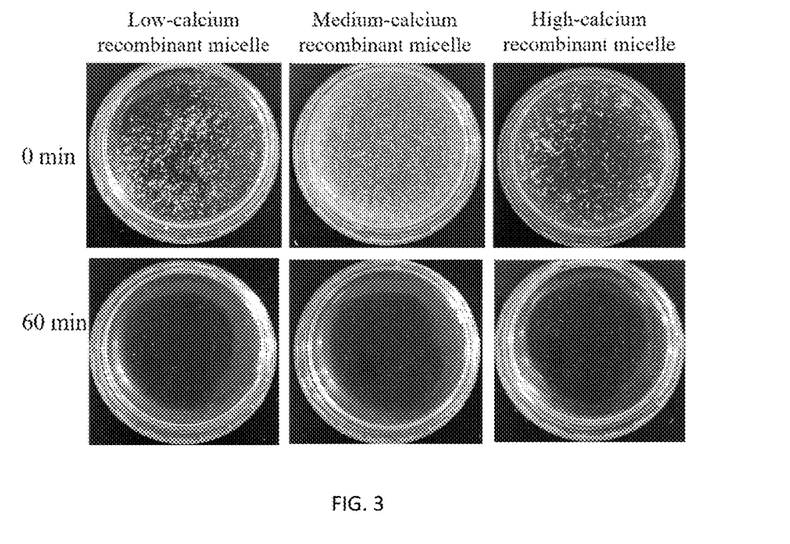
FIG. 3 shows structures of floccules formed after digestion of casein micelle solutions in Example 2 and Comparative Example 3 in a simulated infant gastric juice for 0 minute and 60 minutes.
Figure 4:
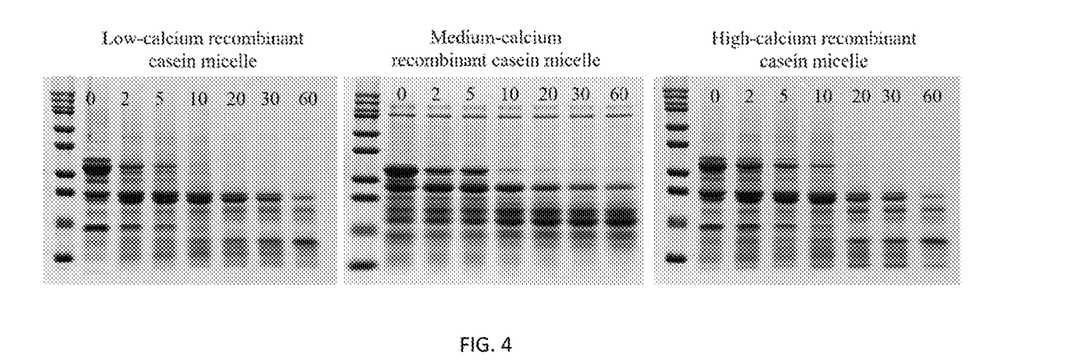
FIG. 4 shows SDS-PAGE diagrams of digesta formed after digestion of the casein micelle solutions in Example 2 and Comparative Example 3 in a simulated infant gastric juice for 0-60 minutes.

Compared with the high-calcium recombinant casein micelle solution, the low-calcium recombinant casein micelle solution and the medium-calcium recombinant casein micelle solution have finer flocculent particles formed in a simulated infant gastric juice (as shown in FIG. 3), a higher hydrolysis rate of casein (as shown in FIG. 4), and a higher hydrolysis degree of casein. It is indicated that the low-calcium recombinant casein micelle solution and the medium-calcium recombinant casein micelle solution have better digestibility, and are more similar to the human milk casein micelle solution in digestibility.

Comparative Example 4 Recombinant Casein Micelle Formed by Mixing β-Casein with a Cow Milk Casein Micelle The separated precipitate rich in β-casein in Example 1 was subjected to dialysis at 4° C. for 72 hours by using a dialysis membrane with a molecular weight cut-off of 7,000 Da to remove a salt. An ion exchange resin, namely Amberlite SR1L Na (0.5 g resin/g casein), was added to a dialysate. After the dialysis was completed, freeze-drying was conducted to obtain pure β-casein.

The pure β-casein was mixed with skimmed cow milk at a casein mass ratio of 1:1 to obtain a recombinant casein micelle solution.

Physicochemical properties of the casein micelle solutions prepared in Example 2 and Comparative Examples 1 and 4 were tested. Results are as follows.

TABLE 4

Physicochemical properties of the casein micelle solutions in
Example 2 and Comparative Examples 1 and 4

| Index | Casein micelle simulating human milk (Example 2) | Human milk casein micelle (Comparative Example 1) | Recombinant casein micelle (Comparative Example 4) |
|---|---|---|---|
| Casein (mM) | 0.17 ± 0.01 | 0.17 ± 0.02 | 2.22 ± 0.05 |
| β-casein (%) | 67.8 ± 1.4 | 68.2 ± 0.2 | 68.2 ± 0.6 |
| $\alpha_{s1}$-casein (%) | 11.9 ± 0.4 | 12.0 ± 0.4 | 20.1 ± 0.2 |
| $\alpha_{s2}$-casein (%) | 0 | 0 | 5.1 ± 0.7 |
| κ-casein (%) | 20.3 ± 0.8 | 19.8 ± 0.6 | 6.6 ± 0.5 |
| Calcium ion (mM) | 7.1 ± 0.1 | 7.1 ± 0.2 | 33.4 ± 0.2 |
| Average particle size (nm) | 78 ± 2 | 65 ± 3 | 134 ± 3 |
| Proportion of free calcium (%) | 69.8 ± 0.5 | 81.9 ± 0.7 | 13.7 ± 0.1 |
| Proportion of free casein (%) | 7.3 ± 0.2 | 14.1 ± 0.5 | 19.7 ± 0.2 |
| Mineralization degree | 13.6 ± 0.1 | 8.8 ± 0.1 | 16.2 ± 0.4 |
| Hydration rate (g water/g dry micelle) | 2.9 ± 0.2 | 3.4 ± 0.1 | 2.5 ± 0.1 |
| Hydrolysis degree (%) | 13.6 ± 0.4 | 15.9 ± 0.5 | 12.0 ± 0.2 |

From Table 4, it can be seen that the recombinant casein micelle solution and the human milk casein micelle solution have a difference in casein composition, the two solutions have an equal proportion of β-casein, and the recombinant casein micelle solution has a higher proportion of $\alpha_{s1}$-casein and a lower proportion of κ-casein and contains $\alpha_{s2}$-casein. The cow milk casein micelle solution has a higher proportion of $\alpha_{s1}$-casein and contains $\alpha_{s2}$-casein. In this case, after the β-casein is mixed with the cow milk casein micelle solution, although the proportion of β-casein is equal to that of the human milk casein micelle solution, the proportions of other kinds of casein are not equal to that of the human milk casein micelle solution. Through comprehensive comparison in average particle size, proportion of free casein, mineralization degree, hydration rate, and other micelle structural properties, it is shown that compared with the recombinant casein micelle, the casein micelle simulating human milk is more similar to the human milk casein micelle in structural properties.

Figure 5:
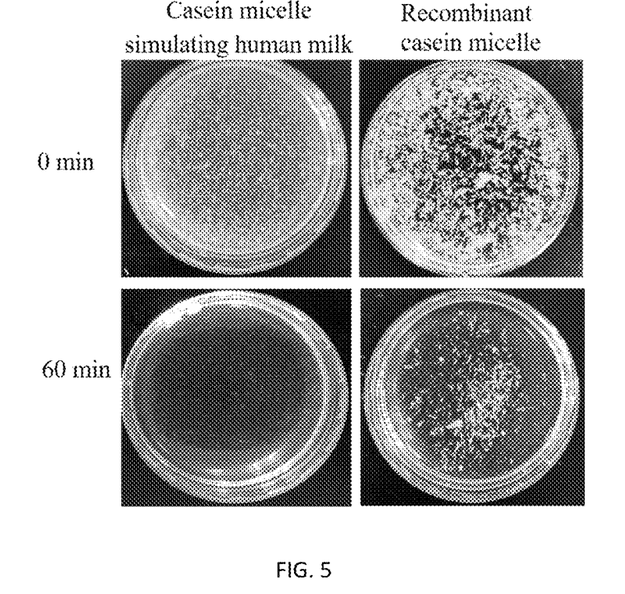
FIG. 5 shows structures of floccules formed after digestion of casein micelle solutions in Example 2 and Comparative Example 4 in a simulated infant gastric juice for 0 minute and 60 minutes.

The recombinant casein micelle solution was maintained at 50° C. for 30 minutes, and then subjected to centrifugation immediately at 150,000 g for 1 hour. A precipitate was redissolved in deionized water to obtain a redissolved solution of a recombinant casein micelle, where casein had a mass concentration of 0.4%. A comparative study was carried out on digestibility of the redissolved solution and the casein micelle solution simulating human milk. Compared with the recombinant casein micelle solution, the casein micelle solution simulating human milk has finer flocculent particles formed in a simulated infant gastric juice (as shown in FIG. 5), no flocculent particles after digestion for 60 minutes, and a higher hydrolysis degree of casein. It is indicated that the casein micelle solution simulating human milk has better digestibility, and is more similar to the human milk casein micelle solution in digestibility.

Comparative Example 5 Recombinant Casein Micelle Prepared from Commercially Available Pure Casein Commercially available pure proteins including κ-casein, $\alpha_s$-casein, and β-casein were purchased (Sigma-Aldrich of America), and the casein composition of the pure proteins was tested. Results are as shown in Table 5.

TABLE 5

Casein composition of commercially available pure proteins

| Index | Pure β-casein | Pure $\alpha_s$-casein | Pure κ-casein |
|---|---|---|---|
| β-casein (%) | 83.0 ± 0.5 | 2.2 ± 0.1 | 0.0 ± 0.0 |
| $\alpha_{s1}$-casein (%) | 10.3 ± 0.2 | 74.9 ± 0.3 | 1.4 ± 0.3 |
| $\alpha_{s2}$-casein (%) | 1.6 ± 0.1 | 20.7 ± 0.4 | 1.7 ± 0.2 |
| κ-casein (%) | 5.1 ± 0.2 | 2.2 ± 0.1 | 96.9 ± 0.4 |

The pure κ-casein, the pure $\alpha_s$-casein, and the pure β-casein were mixed according to a casein mass ratio of 16.3:1.8:81.9 to obtain mixed casein. Then, a recombinant casein micelle was prepared by the method in Example 2.

Physicochemical properties of the casein micelle solutions prepared in Example 2 and Comparative Examples 1 and 5 were tested. Results are as follows.

TABLE 6

Physicochemical properties of the casein micelle solutions in Example 2 and Comparative Examples 1 and 5

| Index | Casein micelle simulating human milk (Example 2) | Human milk casein micelle (Comparative Example 1) | Recombinant casein micelle (Comparative Example 5) |
|---|---|---|---|
| β-casein (%) | 67.8 ± 1.4 | 68.2 ± 0.2 | 68.0 ± 0.6 |
| $\alpha_{s1}$-casein (%) | 11.9 ± 0.4 | 12.0 ± 0.4 | 10.2 ± 0.2 |
| $\alpha_{s2}$-casein (%) | 0 | 0 | 2.0 ± 0.1 |
| κ-casein (%) | 20.3 ± 0.8 | 19.8 ± 0.6 | 19.8 ± 0.7 |
| Average particle size (nm) | 78 ± 2 | 65 ± 3 | 86 ± 3 |
| Proportion of free calcium (%) | 69.8 ± 0.5 | 81.9 ± 0.7 | 67.8 ± 0.6 |
| Proportion of free casein (%) | 7.3 ± 0.2 | 14.1 ± 0.5 | 5.4 ± 0.3 |
| Mineralization degree | 13.6 ± 0.1 | 8.8 ± 0.1 | 14.2 ± 0.4 |
| Hydration rate (g water/g dry micelle) | 2.9 ± 0.2 | 3.4 ± 0.1 | 2.7 ± 0.2 |
| Hydrolysis degree (%) | 13.6 ± 0.4 | 15.9 ± 0.5 | 13.2 ± 0.2 |

From Table 6, it can be seen that the recombinant casein micelle solution and the human milk casein micelle solution have a difference in casein composition, the two solutions have equal proportions of β-casein and κ-casein, and the recombinant casein micelle solution has a lower proportion of $\alpha_{s1}$-casein and contains $\alpha_{s2}$-casein. The commercially available pure $\alpha_s$-casein usually has a certain proportion of $\alpha_{s2}$-casein. In this case, after the pure κ-casein, the pure $\alpha_{s2}$-casein, and the pure β-casein are mixed, although the proportions of β-casein and κ-casein are equal to that of the human milk casein micelle solution, the proportions of other kinds of casein are not equal to that of the human milk casein micelle solution. Through comprehensive comparison in average particle size, proportion of free casein, mineralization degree, hydration rate, and other micelle structural properties, it is shown that compared with the recombinant casein micelle, the casein micelle simulating human milk is more similar to the human milk casein micelle in structural properties. Compared with the recombinant casein micelle solution, the casein micelle solution simulating human milk has a higher hydrolysis degree of casein after digestion in a simulated infant gastric juice. It is indicated that the casein micelle solution simulating human milk has better digestibility, and is more similar to the human milk casein micelle solution in digestibility.

Example 3 Adjustment of Key Ions in Preparation of a Casein Micelle Simulating Human Milk: Ion Type The ion addition batch in Example 2 was adjusted to one batch, and the ion addition type in Example 2 was adjusted as follows:
  a first type: a citrate ion and a phosphate ion were omitted, and a calcium ion (Ca) was added;
  a second type: a citrate ion was omitted, and a calcium ion and a phosphate ion (Ca+P) were sequentially added;
  a third type: a phosphate ion was omitted, and a citrate ion and a calcium ion (Cit+Ca) were sequentially added;
  a fourth type: a citrate ion, a calcium ion, and a phosphate ion (Cit+Ca+P) were sequentially added; and
  a fifth type: a citrate ion, a calcium ion, a phosphate ion, and a potassium ion (the potassium ion was derived from potassium chloride) (Cit+Ca+P+K) were sequentially added.

Other steps were consistent with those in Example 2 to obtain a series of recombinant casein micelle solutions.

Figure 6:
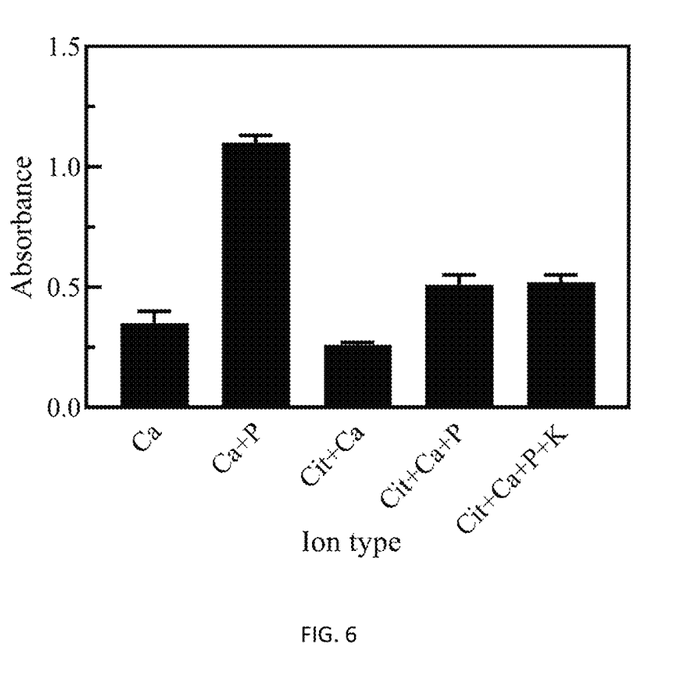
FIG. 6 shows the influence of the ion type on the absorbance of a recombinant casein micelle solution in Example 3.

The absorbance of the obtained series of recombinant casein micelle solutions was tested. Results are as shown in FIG. 6.

Compared with the cow milk casein micelle, the human milk casein micelle has a smaller particle size, so that the human milk casein micelle solution has lower turbidity. From FIG. 6, it can be seen that after addition of the Ca type or the Cit+Ca type, the systems have too low absorbance values, and after addition of the Ca+P type, the system has a too high absorbance value, preliminarily indicating that a micelle structure similar to the human milk casein micelle is difficult to form under induction in a simple ionic environment. After addition of the Cit+Ca+P type or the Cit+Ca+P+K type, the systems have moderate absorbance values, which have no significant difference, preliminarily indicating that the citrate ion, the calcium ion, and the phosphate ion are necessary to obtain a micelle structure similar to the human milk casein micelle. After addition of the Cit+Ca+P+K type, the system has a potassium ion concentration of 21.5 mM (the potassium ion was derived from potassium chloride), which is the same as that of the human milk casein micelle solution (as shown in Table 2), indicating that the ionic strength has little influence on the formation of a micelle. Therefore, the Cit+Ca+P type can be preferably added in a subsequent optimization experiment for preparation of a casein micelle simulating human milk.

Example 4 Adjustment of Key Ions in Preparation of a Casein Micelle Simulating Human Milk: Ion Addition Sequence The ion addition batch in Example 2 was adjusted to one batch, and the ion addition sequence in Example 2 was adjusted as follows:
- a first sequence a citrate ion, a calcium ion, and a phosphate ion (Cit+Ca+P) were sequentially added;
- a second sequence a citrate ion, a phosphate ion, and a calcium ion (Cit+P+Ca) were sequentially added;
- a third sequence a calcium ion, a citrate ion, and a phosphate ion (Ca+Cit+P) were sequentially added;
- a fourth sequence a calcium ion, a phosphate ion, and a citrate ion (Ca+P+Cit) were sequentially added;
- a fifth sequence a phosphate ion, a citrate ion, and a calcium ion (P+Cit+Ca) were sequentially added; and
- a sixth sequence a phosphate ion, a calcium ion, and a citrate ion (P+Ca+Cit) were sequentially added.

Other steps were consistent with those in Example 2 to obtain a series of recombinant casein micelle solutions.

Figure 7:
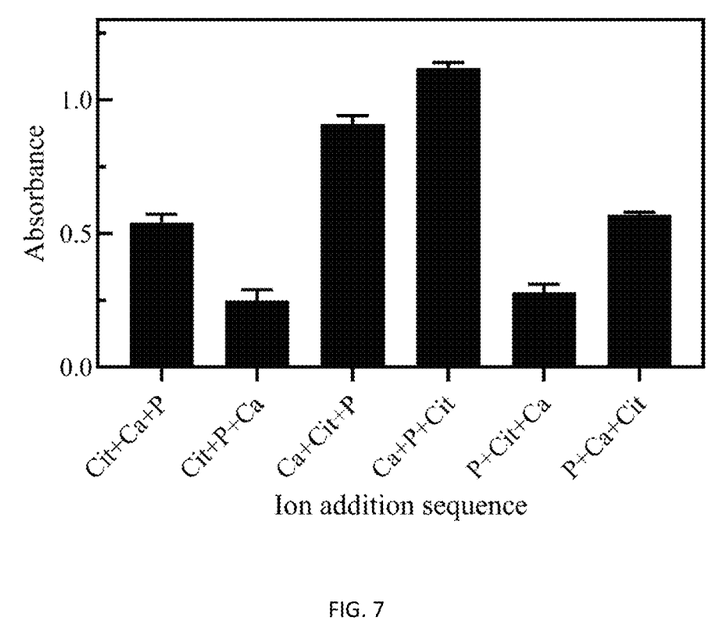
FIG. 7 shows the influence of the ion addition sequence on the absorbance of a recombinant casein micelle solution in Example 4.

The absorbance of the obtained series of recombinant casein micelle solutions was tested. Results are as shown in FIG. 7.

A formation process of the natural human milk casein micelle in vivo involves balanced interactions between different kinds of casein, between casein and various ions, and between different ions. From FIG. 7, it can be seen that after addition of the Cit+P+Ca sequence or the P+Cit+Ca sequence, the systems have too low absorbance values, and after addition of the Ca+Cit+P sequence or the Ca+P+Cit sequence, the systems have too high absorbance values, preliminarily indicating that when the calcium ion is added in the last or first sequence, the bonding degree of the calcium ion and casein is too low or too high, and the formation of a micelle structure similar to the human milk casein micelle is not facilitated. After addition of the Cit+Ca+P sequence or the P+Ca+Cit sequence, the systems have moderate absorbance values, which have no significant difference, preliminarily indicating that when moderate bonding of the calcium ion and casein is formed the formation of a micelle structure similar to the human milk casein micelle is facilitated. Therefore, the Cit+Ca+P sequence or the P+Ca+Cit sequence can be preferably added in sequence in a subsequent optimization experiment for preparation of a casein micelle simulating human milk.

Example 5 Adjustment of Key Ions in Preparation of a Casein Micelle Simulating Human Milk: Ion Addition Method and Batch The ion addition method and batch in Example 2 were adjusted as follows.

A first addition method: a citrate ion first was completely added, and then a calcium ion and a phosphate ion in batches (Ca+P) were added:
- a first batch: first the citrate ion was completely added, then the calcium ion was completely added, and finally the phosphate ion was completely added;
- a second batch: solutions of the calcium ion and the phosphate ion were divided into 2 equal parts; the citrate ion was completely added; 1 part of the calcium ion and 1 part of the phosphate ion were sequentially added; and the step of adding the calcium ion and the phosphate ion for one time was repeated until the two ions were completely added;
- a third batch: solutions of the calcium ion and the phosphate ion were divided into 3 equal parts; the citrate ion was sequentially added; 1 part of the calcium ion and 1 part of the phosphate ion were sequentially added; and the step of adding the calcium ion and the phosphate ion for two times was repeated until the two ions were completely added; and
- a fourth batch: solutions of the calcium ion and the phosphate ion were divided into 4 equal parts; the citrate ion was completely added; 1 part of the calcium ion and 1 part of the phosphate ion were sequentially added; and the step of adding the calcium ion and the phosphate ion for three times was repeated until the two ions were completely added.

A second addition method: a citrate ion, a calcium ion, and a phosphate ion in batches (Cit+Ca+P) were added:
- a first batch: first the citrate ion was completely added, then the calcium ion was completely added, and finally the phosphate ion was completely added;
- a second batch: solutions of the citrate ion, the calcium ion, and the phosphate ion were divided into 2 equal parts; 1 part of the citrate ion, 1 part of the calcium ion and 1 part of the phosphate ion were sequentially added; and the above three steps for one time were repeated until the three ions were completely added;
- a third batch: solutions of the citrate ion, the calcium ion, and the phosphate ion were divided into 3 equal parts; 1 part of the citrate ion, 1 part of the calcium ion and 1 part of the phosphate ion were sequentially added; and the above three steps for two times were repeated until the three ions were completely added; and
- a fourth batch: solutions of the citrate ion, the calcium ion, and the phosphate ion were divided into 4 equal parts; 1 part of the citrate ion, 1 part of the calcium ion and 1 part of the phosphate ion were sequentially added; and the above three steps for three times were repeated until the three ions were completely added.

Other steps were consistent with those in Example 2 to obtain a series of recombinant casein micelle solutions.

Figure 8:
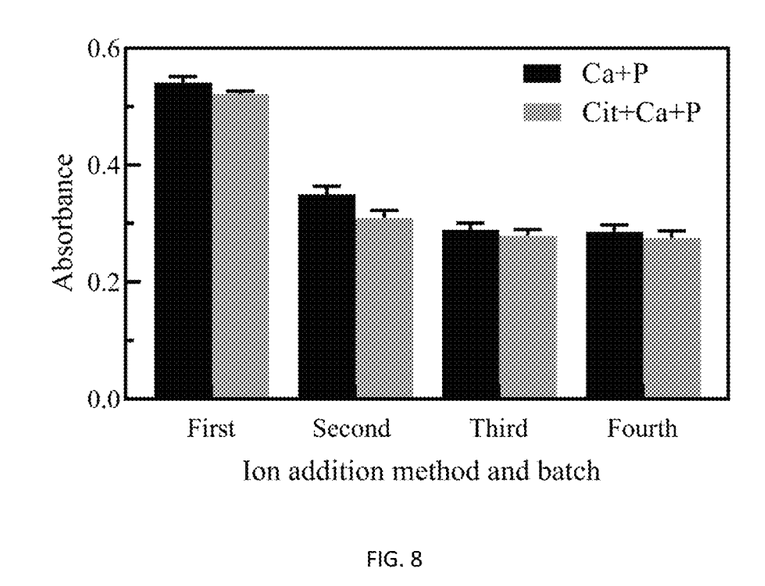
FIG. 8 shows the influence of the ion addition method and batch on the absorbance of a recombinant casein micelle solution in Example 5.

The absorbance of the obtained series of recombinant casein micelle solutions was tested. Results are as shown in FIG. 8.

A formation process of the natural human milk casein micelle in vivo mainly occurs in Golgi apparatuses of mammary epithelial cells. In this process, casein and various ions are continuously transported to the Golgi apparatuses. The formation process of the human milk casein micelle in vivo can be better simulated by adding ions in batches. From FIG. 8, it can be seen that with the increase of the ion addition batch, the absorbance values of systems are in a decreased trend, and after the addition batch is increased to three batches, the absorbance values of the systems become stable. Moreover, through comparison of the two addition methods (Ca+P and Cit+Ca+P), the systems have no significant difference in absorbance value. Therefore, the three ion addition batches and the Ca+P or Cit+Ca+P addition method can be preferably used in a subsequent optimization experiment for preparation of a casein micelle simulating human milk.

Example 6 Adjustment of Key Ions in Preparation of a Casein Micelle Simulating Human Milk: Concentration of a Citrate Ion The concentration of the citrate ion in Example 2 was adjusted to 0-7 mM, other steps were consistent with those in Example 2, and a series of recombinant casein micelle solutions were obtained.

The absorbance of the obtained series of recombinant casein micelle solutions was tested. Results are as shown in FIG. 9.

Figure 9:
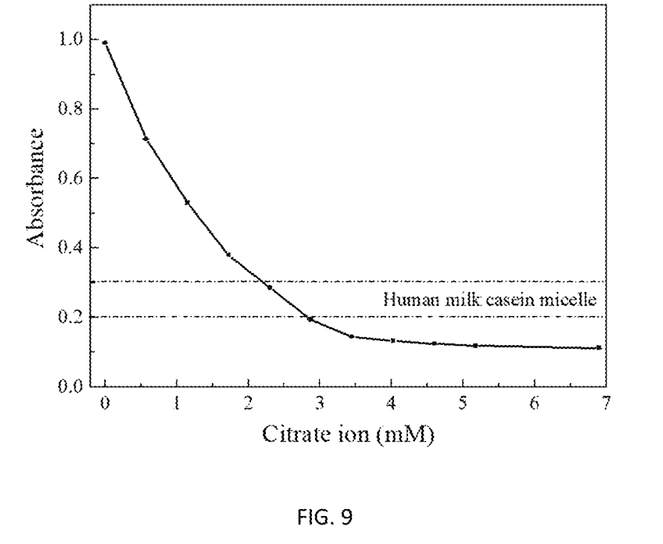
FIG. 9 shows the influence of the concentration of a citrate ion on the absorbance of a recombinant casein micelle solution in Example 6. A region between two dotted lines refers to an absorbance range of a human milk casein micelle solution.

From FIG. 9, it can be seen that the human milk casein micelle solution has an absorbance value of 0.2-0.3 (the absorbance value is corrected based on the concentration of casein). When the citrate ion has a concentration of 2.1-2.8 mM, the absorbance values of systems are within the range of the absorbance value of the human milk casein micelle solution. Therefore, the citrate ion with a concentration of 2.1-2.8 mM can be preferably used in preparation of a casein micelle simulating human milk.

Example 7 Adjustment of Key Ions in Preparation of a Casein Micelle Simulating Human Milk: Concentration of a Calcium Ion The concentration of the calcium ion in Example 2 was adjusted to 0-17.1 mM, other steps were consistent with those in Example 2, and a series of recombinant casein micelle solutions were obtained.

The absorbance of the obtained series of recombinant casein micelle solutions was tested. Results are as shown in FIG. 10.

Figure 10:
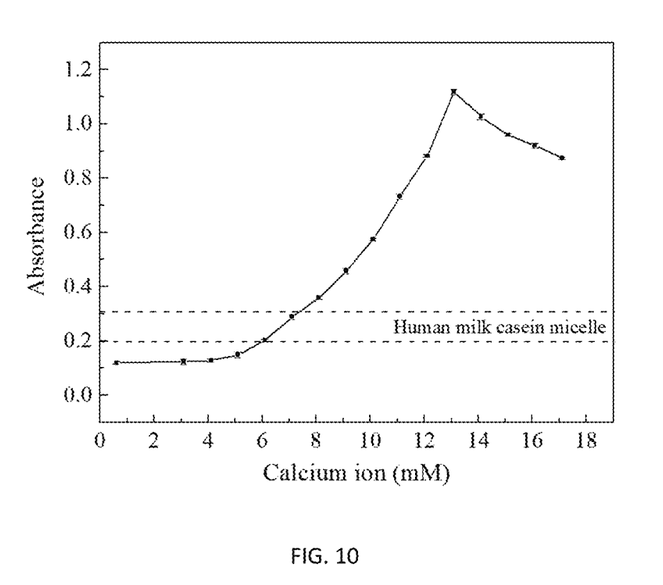
FIG. 10 shows the influence of the concentration of a calcium ion on the absorbance of a recombinant casein micelle solution in Example 7.

From FIG. 10, it can be seen that when the calcium ion has a concentration of 6.0-7.2 mM, the absorbance values of systems are within the range of the absorbance value of the human milk casein micelle solution. Therefore, the calcium ion with a concentration of 6.0-7.2 mM can be preferably used in preparation of a casein micelle simulating human milk.

Example 8 Adjustment of Key Ions in Preparation of a Casein Micelle Simulating Human Milk: Concentration of a Phosphate Ion The concentration of the phosphate ion in Example 2 was adjusted to 0-19 mM, other steps were consistent with those in Example 2, and a series of recombinant casein micelle solutions were obtained.

The absorbance of the obtained series of recombinant casein micelle solutions was tested. Results are as shown in FIG. 11.

Figure 11:
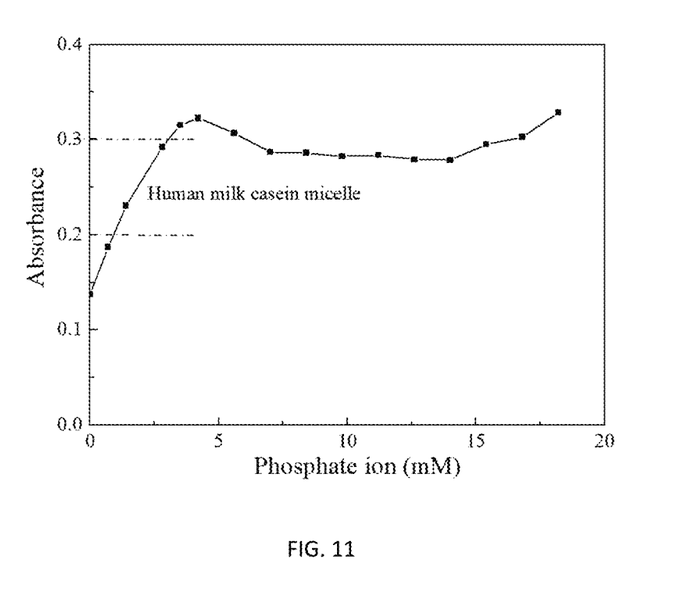
FIG. 11 shows the influence of the concentration of a phosphate ion on the absorbance of a recombinant casein micelle solution in Example 8.

From FIG. 11, it can be seen that when the phosphate ion has a concentration of 1.5-3.0 mM, the absorbance values of systems are within the range of the absorbance value of the human milk casein micelle solution. Therefore, the phosphate ion with a concentration of 1.5-3.0 mM can be preferably used in preparation of a casein micelle simulating human milk.

What is claimed is:

1. A method for preparing a casein micelle simulating human milk, comprising the following steps:
   adding three ions involving a citrate ion, a calcium ion, and a phosphate ion to a solution of compound casein to obtain a mixed solution; and if the pH of the mixed solution is below the range of 6.7-7.4, adjusting the pH of the mixed solution to 6.7-7.4 by adding a NaOH solution or a KOH solution, and obtaining a solution of the casein micelle simulating human milk;
   wherein β-casein, κ-casein, and $\alpha_{s1}$-casein have a mass proportion of 65-71%, 17-23%, and 9-15% in the compound casein respectively; and
   in the solution of the casein micelle simulating human milk, the compound casein has a mass concentration of 0.3-0.6%, the citrate ion has a concentration of 1.5-4.2 mM, the calcium ion has a concentration of 4.5-10.8 mM, and the phosphate ion has a concentration of 1.1-4.5 mM.

2. The method according to claim 1, wherein a method for preparing the compound casein comprises the following steps:
   (1) subjecting animal milk to centrifugation at 20-30° C. for 20-40 minutes to obtain skimmed milk; adding a hydrochloric acid solution until the pH is 4.3-4.9, and conducting centrifugation for 10-20 minutes to obtain a casein precipitate; redissolving the casein precipitate in water, and adding a NaOH solution until the pH is 10-12 to obtain a casein redissolved solution, wherein casein has a mass concentration of 2-3%;
   (2) adding calcium chloride to the casein redissolved solution to reach a concentration of 50-70 mM, and conducting centrifugation for 10-20 minutes to obtain a precipitate comprising $\alpha_s$-casein and β-casein and a supernatant comprising κ-casein; adding a hydrochloric acid solution to the supernatant comprising κ-casein until the pH is 3-4, and conducting centrifugation to obtain a precipitate comprising κ-casein; redissolving the precipitate comprising $\alpha_s$-casein and β-casein in water, and adding a NaOH solution until the pH is 6.5-7.5 to make the casein to have a mass concentration of 2-3%; and lowering temperature to 0-8° C., adding a hydrochloric acid solution until the pH is 4.3-4.9, maintaining temperature at 0-8° C. for 4-8 hours, taking a supernatant after centrifugation, heating the supernatant to 30-40° C., and then conducting centrifugation to obtain a precipitate comprising β-casein; and
   (3) mixing the precipitate comprising κ-casein with the precipitate comprising β-casein according to a total casein mass ratio of 6:4 to 8:2, conducting dialysis at 0-8° C. for 48-96 hours by using a dialysis membrane with a molecular weight cut-off of 5,000-10,000 Da, adding an ion exchange resin to a dialysate, and after the dialysis is completed, conducting freeze-drying to obtain the compound casein.

3. The method according to claim 1, wherein the three ions involving the citrate ion, the calcium ion, and the phosphate ion are added in 2 addition sequences, comprising sequentially adding the citrate ion, the calcium ion, and the phosphate ion, or sequentially adding the phosphate ion, the calcium ion, and the citrate ion.

4. The method according to claim 1, wherein the three ions involving the citrate ion, the calcium ion, and the phosphate ion are added in 2 addition methods and 3-5 addition batches, comprising:
   (1) dividing stock solutions of two ions involving the calcium ion and the phosphate ion into 3-5 equal parts; completely adding the citrate ion; sequentially adding 1 part of the calcium ion and 1 part of the phosphate ion; and repeating the step of adding the calcium ion and the phosphate ion for 2-4 times until the two ions are completely added; and
   (2) dividing stock solutions of the citrate ion, the calcium ion, and the phosphate ion into 3-5 equal parts; sequentially adding 1 part of the citrate ion, 1 part of the calcium ion and 1 part of the phosphate ion; and repeating above three steps for 2-4 times until the three ions are completely added.

5. The method according to claim 1, wherein the citrate ion is brought by a stock solution of one or two of potassium citrate and sodium citrate, and the stock solution has a citrate ion concentration of 150-420 mM in the stock solution.

6. The method according to claim 1, wherein the calcium ion is brought by a stock solution of one or two of calcium chloride and calcium nitrate, and the stock solution has a calcium ion concentration of 30-72 mM in the stock solution.

7. The method according to claim 1, wherein the phosphate ion is brought by a stock solution of one or two of dipotassium hydrogen phosphate and disodium hydrogen phosphate, and the stock solution has a phosphate ion concentration of 7.3-30 mM in the stock solution.

8. The method according to claim 2, wherein the animal milk comprises cow milk, goat milk, sheep milk, buffalo milk, yak milk, dromedary camel milk, bactrian camel milk, horse milk, and donkey milk.

9. The method according to claim 1, wherein the solution of compound casein is obtained by dissolving the compound casein in water, and the casein has a mass concentration of 0.6-1.2%.

10. The method according to claim 1, wherein the pH of the mixed solution is adjusted by adding a 0.01-0.05 M NaOH solution or a KOH solution.

11. The method according to claim 1, wherein a volume of the solution of the casein micelle simulating human milk is 2-4 times that of the solution of the compound casein.

12. The method according to claim 1, wherein temperature control, stirring rotation speed, and balance time after the three ions involving the citrate ion, the calcium ion, and the phosphate ion are added are 35-39° C., 500-1,000 rpm, and 10-30 minutes respectively.

* * * * *